Patented Nov. 7, 1922.

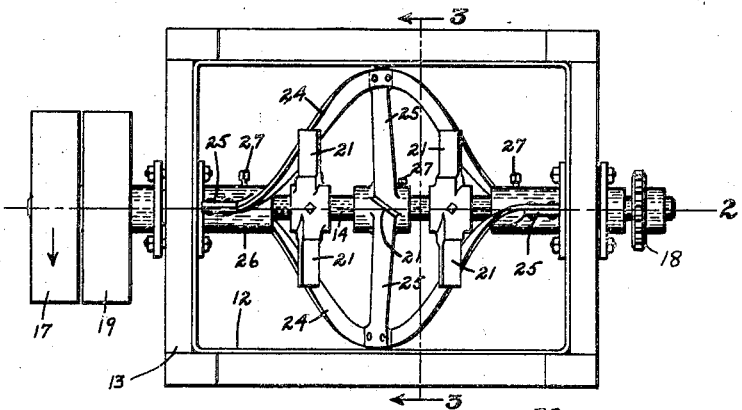
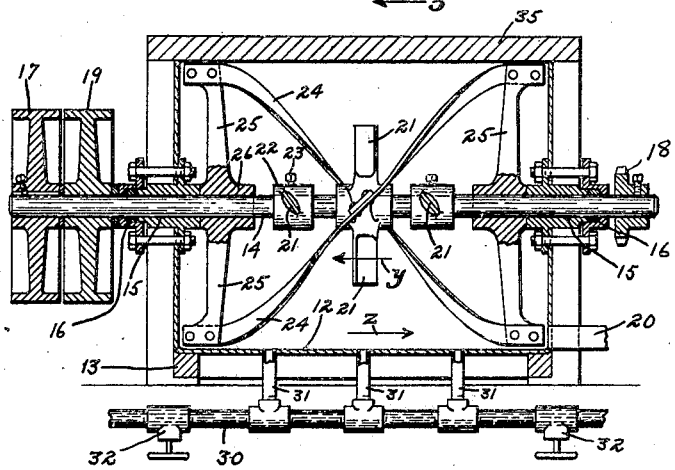
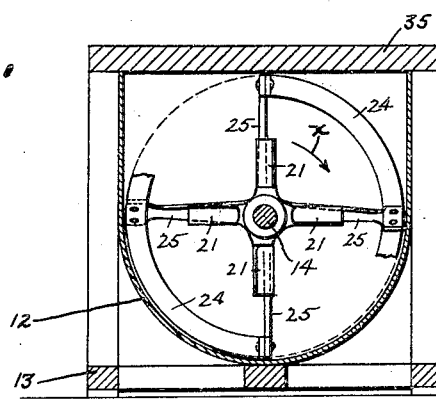

1,434,585

UNITED STATES PATENT OFFICE.

GEORGE B. BATES, OF LYNN, MASSACHUSETTS.

MIXING APPARATUS.

Application filed May 6, 1922. Serial No. 558,904.

*To all whom it may concern:*

Be it known that I, GEORGE B. BATES, a citizen of the United States, residing at Lynn, in the county of Essex and State of Massachusetts, have invented new and useful Improvements in Mixing Apparatus, of which the following is a specification.

This invention relates to mixing apparatus adapted to cause a uniform distribution in a trough or tank of the ingredients of a pasty mixture or composition, so that the mixture will be uniform throughout the entire mass.

The object of the invention is to provide a rapidly operating compact and simple apparatus which includes a mixing trough, and means operated by a single driving-shaft for moving the central portion of a mass of material in the trough in one direction, and the outer portion in the opposite direction.

The invention is embodied in the improvements hereinafter described and claimed.

Of the accompanying drawings forming a part of this specification,—

Figure 1 is a top plan view of a mixing apparatus embodying the invention, the cover of the trough being removed.

Figure 2 is a vertical section on line 2—2 of Figure 1.

Figure 3 is a horizontal section on line 3—3 of Figure 1.

The same reference characters indicate the same parts in all of the figures.

In the drawings, 12 represents a trough which is substantially U-shaped in cross section, and has a transversely curved semicylindrical bottom, and ends or heads at opposite ends of the bottom. The trough is preferably made of sheet metal, the bottom and longitudinal sides being made in one piece, and the ends or heads of separate pieces. The trough thus constructed may be supported by a suitable wooden frame 13. The trough may be of any other suitable construction. A horizontal driving-shaft 14 is journaled in bearings 15, at opposite ends of the trough, said bearings being preferably provided with stuffing-boxes, indicated at 16 (Figure 2). The shaft may be driven by any suitable means, such as a belt running on a pulley 17. A loose pulley 19 may be located beside the pulley 17, on to which the belt may be slipped. The shaft 14 is provided with inner and outer conveying blades revolved thereby, the inner blades being adapted to move in one direction, the central portion of a mass of material with which the trough is charged, while the outer blades are adapted to move in the opposite direction, the outer portion of said mass, so that the ingredients introduced into the trough are circulated and intimately mixed, the outer portion of the mass being moved toward and expelled through an outlet 20.

The inner conveying blades 21 are radially arranged and have hubs 22, fixed by set screws 23 to the shaft. Said blades have obliquely arranged side faces, so formed and arranged that when the shaft is rotated in the direction of arrow $x$ (Figure 3), the blades 21 move the central portion of a mass of material in the direction of arrow $y$ (Figure 2).

The outer conveying blades 24, preferably two in number, are substantially helical, and are fixed at their ends to arms 25, having hubs 26, which are fixed by set screws 27, to the shaft. The blades 24 have outer edges which conform to the curvature of the tank bottom, and winding side faces, which are formed and arranged to move the outer portion of the mass in the direction of arrow $z$ (Figure 2). The inner edges of the helical blades 24 are separated from the shaft by an inner blade-receiving space, the width of which is greater than the length of the radial blades 21, so that the radial blades are wholly within the helical blades. The outer blades 24 are adapted to act on the outer portion of a charge of material in the trough, and move said portion in one direction, without obstruction by the inner blades 21. Said inner blades are adapted to act on the central portion of the charge and move the same in the opposite direction, without obstruction by the outer blades. It will be seen, therefore, that a portion of the charge is acted on only by the inner blades, and is moved unobstructedly thereby to one end of the trough. This portion is stirred and mixed by the inner blades, and is then presented to and controlled only by the outer blades, and moved unobstructedly by the latter to the opposite end of the trough. The machine is, therefore, adapted to rapidly circulate the material until it is thoroughly mixed, and to then rapidly eject the material through the outlet, which may be provided with a suitable valve or closure not shown. The ingredients in the portion moved by the blades 24 are thoroughly mixed, and are forced from the trough through the outlet 20, which may be provided with a suitable valve or closure (not shown).

A fluid such as water or steam may be supplied to the trough by means including a main conduit 30, and a branch conduit 31, connecting the main conduit with the trough, as shown by Figure 2. The conduit 30 is provided at opposite sides of the branch conduit with shut-off valves 32, so that fluid may be supplied from either end of the main conduit, the other end being shut off. There may be a plurality of branch conduits 31, as shown.

The trough is provided with a cover 35. A sifter adapted to deliver powdered material, such as sifted flour, to the trough, may be driven by a sprocket wheel 18, on the shaft 14, and suitable connections between said wheel and the sifter.

I claim:

A mixing apparatus comprising a trough having a cylindraceous bottom; a rotary shaft concentric with said bottom; helical blades fixed to the shaft and having outer edges in close proximity to, and conforming with said bottom, and inner edges separated from the shaft by an inner blade-receiving space, said helical blades being adapted to move material in one direction lengthwise of the trough; and radial blades fixed to the shaft, and adapted to move material in the opposite direction; said apparatus being characterized by the fact that the radial blades are shorter than the radial distance between the shaft and the inner edges of the helical blades, and are wholly within said space, so that the central portion of a charge in the trough is moved unobstructedly by the radial blades to one end of the trough, and there taken by the outer blades and moved unobstructedly thereby to the opposite end, two oppositely moving currents, each free from interference with the other being maintained in the trough.

In testimony whereof I have affixed my signature.

GEORGE B. BATES.